United States Patent [19]

Wilson

[11] Patent Number: 5,184,432
[45] Date of Patent: Feb. 9, 1993

[54] TOOL FOR SHARPENING TUNGSTEN ELECTRODES

[76] Inventor: John W. Wilson, Coffman Estates, Box 49, Elkmont, Ala. 46320

[21] Appl. No.: 759,875

[22] Filed: Sep. 13, 1991

[51] Int. Cl.⁵ .......................... B25B 5/00; B24B 7/00; B24B 41/06
[52] U.S. Cl. ........................................ 51/236; 51/125; 51/217 T
[58] Field of Search ............. 30/216 R, 216 P, 216 T, 30/217 T, 218 T, 216 P, 217 P, 125, 125.5, 129, 236

[56] References Cited

U.S. PATENT DOCUMENTS

| | | | |
|---|---|---|---|
| 2,613,485 | 10/1952 | Jocoby, Jr. | 51/216 R |
| 2,635,398 | 4/1953 | Sohn | 51/216 P |
| 3,878,653 | 4/1975 | Kozlay | 51/216 P |
| 4,575,971 | 3/1986 | Keneson | 51/236 |
| 5,001,868 | 3/1991 | Jankus et al. | 51/217 T |

Primary Examiner—Frank T. Yost
Assistant Examiner—Paul W. Heyrana
Attorney, Agent, or Firm—Phillips & Beumer

[57] ABSTRACT

A tool for holding tungsten electrodes for sharpening by an abrasive wheel has a generally cylindrical body with an axial bore at each end for receiving an electrode. The bores have different diameters for use with two sizes of electrodes. The bore is sized to provide a gap between the electrode and the wall of the bore so as to allow the electrode to rotate when held against the wheel. The tool enables the electrode to be held against the grinding wheel at an angle as required for producing a sharp point.

9 Claims, 2 Drawing Sheets

TOOL FOR SHARPENING TUNGSTEN ELECTRODES

FIELD OF THE INVENTION

This invention relates to sharpening of tungsten welding electrodes.

BACKGROUND OF THE INVENTION

Tungsten inert gas (TIG) welding is widely used for producing high quality welds for a variety of metals. One of the problems presented in TIG welding in the maintenance of a sharp point on the tungsten electrode used in this method of welding. Tungsten electrodes typically have a diameter such as 1/16 or 3/32 inch, and the end of the electrode which applies the energy is given a sharp point. Over time and use, the electrode constantly loses its pointed tip and may become contaminated with splattered material. This results in deterioration of the capacity of the electrode to confine the arc and electrical energy to the desired application site. Frequent sharpening of the tungsten electrode is therefore required.

Various methods and apparatus for sharpening welding electrodes are disclosed in the prior art. U.S. Pat. No. 4,631,027, issued Dec. 23, 1986, to Lindburgh, discloses apparatus for mounting a tungsten electrode in acute relation to a cutting torch to enable sharpening by vaporizing away the electrode in the flame of the torch. This reference also discloses a prior approach to sharpening of tungsten electrodes by abrasive grinding, the electrode being chucked into a hand drill mounted to the apparatus relative to a grinding wheel. These methods require use of mounting fixtures that are inconvenient for use by welders on the work site. In practice, the expedient of sharpening the electrode tip by manually holding the electrode against the grinding wheel is frequently used. This presents difficulty in that the electrode quickly heats up and becomes hard and dangerous to hold. Rotation of the electrode as required to obtain a symmetrical point is also hard to control in this procedure. It is desired to provide a simple and convenient tool that will enable a welder to hold an electrode in position for being sharpened by an abrasive wheel with the electrode being allowed to rotate freely.

SUMMARY OF THE INVENTION

The present invention is directed to an electrode holder which may take the form a generally cylindrical body having an axially extending bore at one or both ends of the body, the bore being sized to receive an electrode that is supported for being held against the grinding wheel, with a sufficient gap being provided between the bore wall and the electrode to enable rotation of the electrode during grinding. Different size bores may be provided at each end of the rod to accommodate two sizes of electrodes. The holder may be made in a size approximating that of a fountain pen and provided with a clip. Thus, the welder may carry it in a shirt pocket and have it readily available for use.

DESCRIPTION OF THE PREFERRED EMBODIMENT

Figure 1:
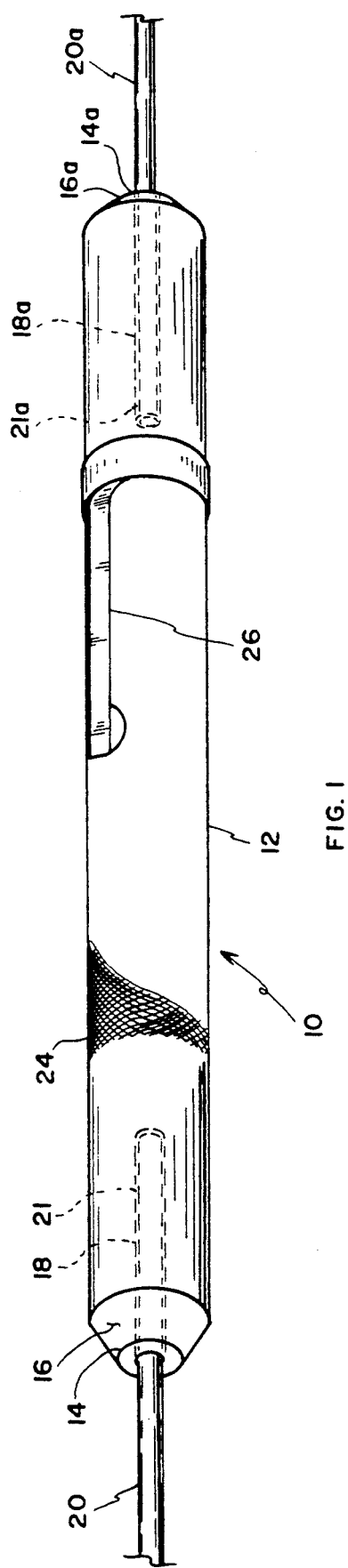
FIG. 1 is pictorial view of an electrode holder embodying the invention, with bores for receiving the electrodes shown in dashed lines.

Referring to FIG. 1 of the drawings, there is shown an electrode holder 10 embodying the invention. The holder has an elongated, generally cylindrical body 12 which may be made by machining of aluminum stock. The body at each end has a frustoconical structure defined by a flat circular end surface 14, 14a normal to the axis of the body and an inwardly tapered surface 16, 16a. A cylindrical shaped bore 18, 18a extending axially into the body is provided at each end, the bore being sized to receive a tungsten electrode 20, 20a and to provide a gap 21, 21a such as 0.003 to 0.005 between the electrode and wall of the bore so as to enable the electrode to rotate while being held in position during grinding. The bore should have a depth sufficient to support the electrode in axial position while minimizing waste due to unusable stub ends. A depth of 0.75 inch is suitable for this purpose.

In the embodiment shown, bore 18 has a diameter of 0.067 inch for receiving an electrode 20 having a diameter of 1/16 inch, and bore 18a has a diameter of 0.098 inch for receiving an electrode 20a having a diameter of 3/32 inch. Electrodes of other sizes may be accommodated by varying the bore size as required.

Tapered portions 16, 16a at ends of the body are provided to avoid having end edges that might come into contact with the grinding wheel.

Figure 2:
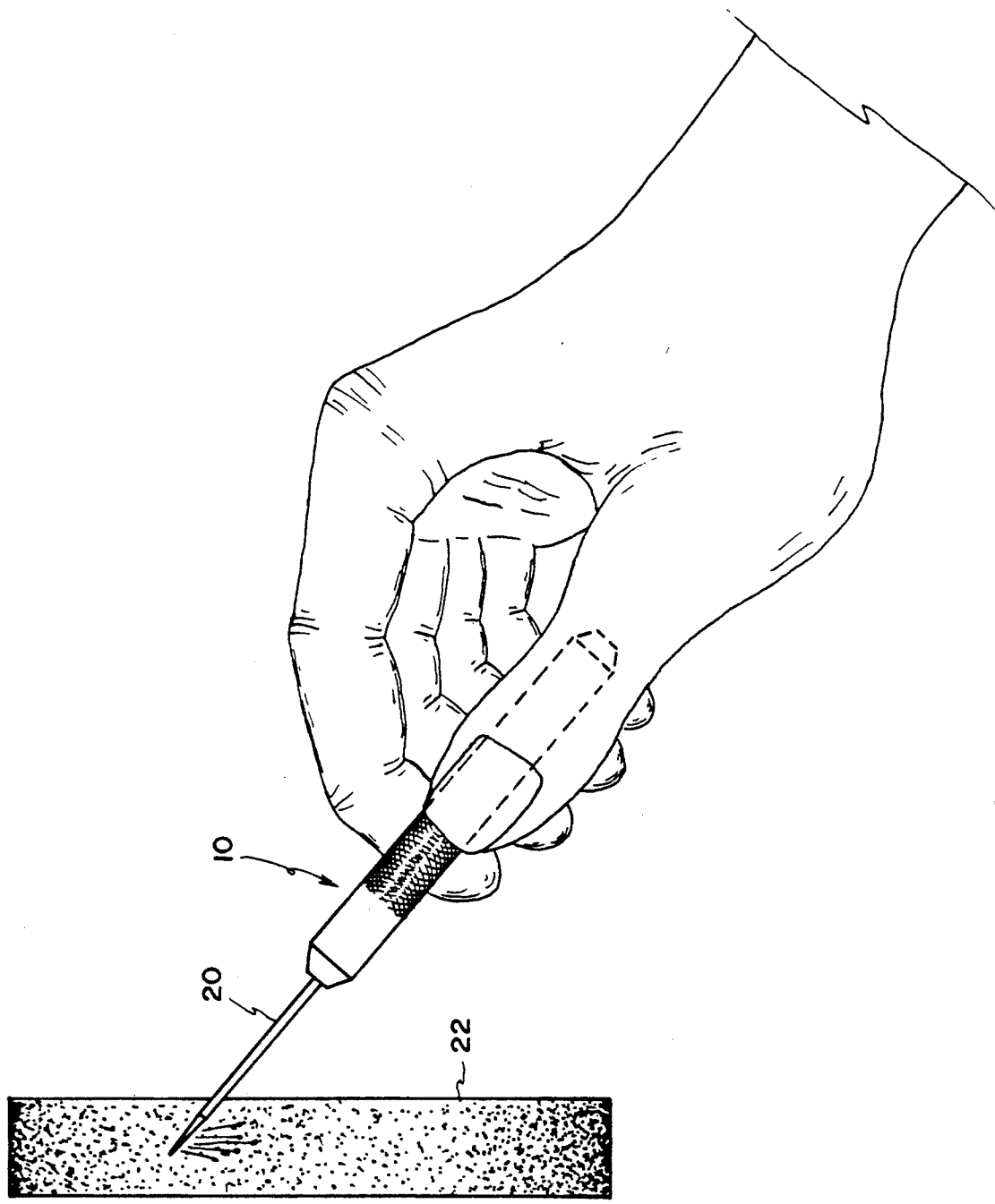
FIG. 2 is a pictorial view showing an electrode being supported against the grinding wheel by use of the holder.

As shown in FIG. 2, sharpening of electrode 20 on abrasive wheel 22 may be carried out by grasping the holder and placing it at an angular position in relation to the wheel as required to obtain a sharp point. Contact of the rotating wheel with the electrode causes the electrode to rotate constantly, quickly producing a symmetrical point. The electrode would normally be held at an angle such as 45° with relation to the abrasive surface.

Body 12 may be provided with a knurled or otherwise roughened surface 24 to facilitate firm grasping. A pocket clip 26 of the type found on fountain pens may also be provided for securing the holder in a user's pocket.

Electrode holders embodying the invention provide for a simple but quick and effective means of for sharpening tungsten electrodes without use of other holding fixtures. Sharpening expenses are minimized without creation of safety problems. No special skills are required in use of the electrode holding, and sharpening may be readily carried out at the work site.

While the invention is described above with respect to specific embodiments, it is not to be understood as limited thereto but is limited only as indicated by the appended claims.

I claim:

1. A one-piece tool for supporting a welding electrode in position for being sharpened on an abrasive wheel comprising:
   an elongated body having a longitudinal axis;
   a cylindrical-shaped bore defined along said axis in at least one end of said body;
   said bore extending partially through said body and terminated by a solid portion of said body extending entirely across the body and integral with a side wall defining the bore; and said bore having a diameter such as to enable the bore to receive a welding electrode therein and allow the electrode to be rotated by said abrasive wheel.

2. A tool as defined in claim 1 wherein said body is generally cylindrical in shape.

3. A tool as defined in claim 2 wherein an end of said body wherein the bore is defined has a frustoconical shape.

4. A tool as defined in claim 3 wherein said bore has a diameter selected to provide a gap of 0.003 to 0.005 inch between an electrode of a predetermined size and a wall defining the bore.

5. A tool as defined in claim 4 wherein said bore has a depth of 0.75 inch.

6. A tool as defined in claim 2 including a bore defined in each end thereof.

7. A tool as defined in claim 6 wherein an outer surface of said body is roughened at a location selected to facilitate hand grasping of the tool.

8. A tool as defined in claim 6 wherein the diameter of the bore of one end of the tool differs from the diameter of the bore at the other end.

9. A tool as defined in claim 1 wherein the solid portion of said body terminating said bore is generally flat.

* * * * *